Jan. 19, 1943.  J. M. OWEN  2,308,533
SAW RACK
Filed Nov. 9, 1939
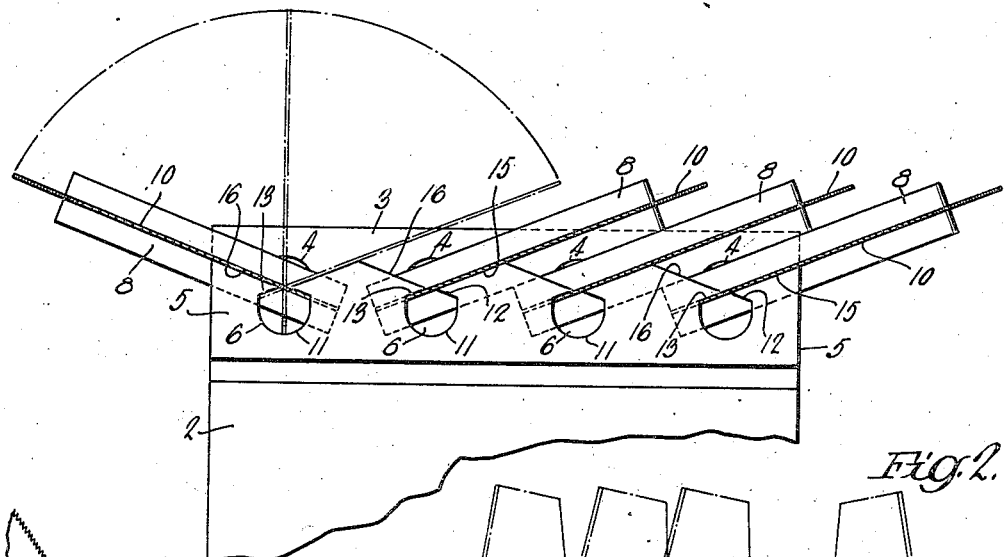
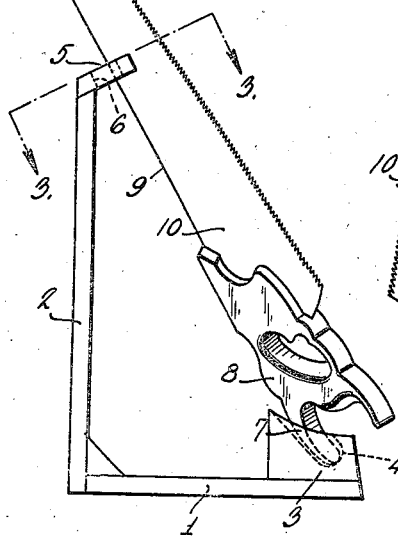
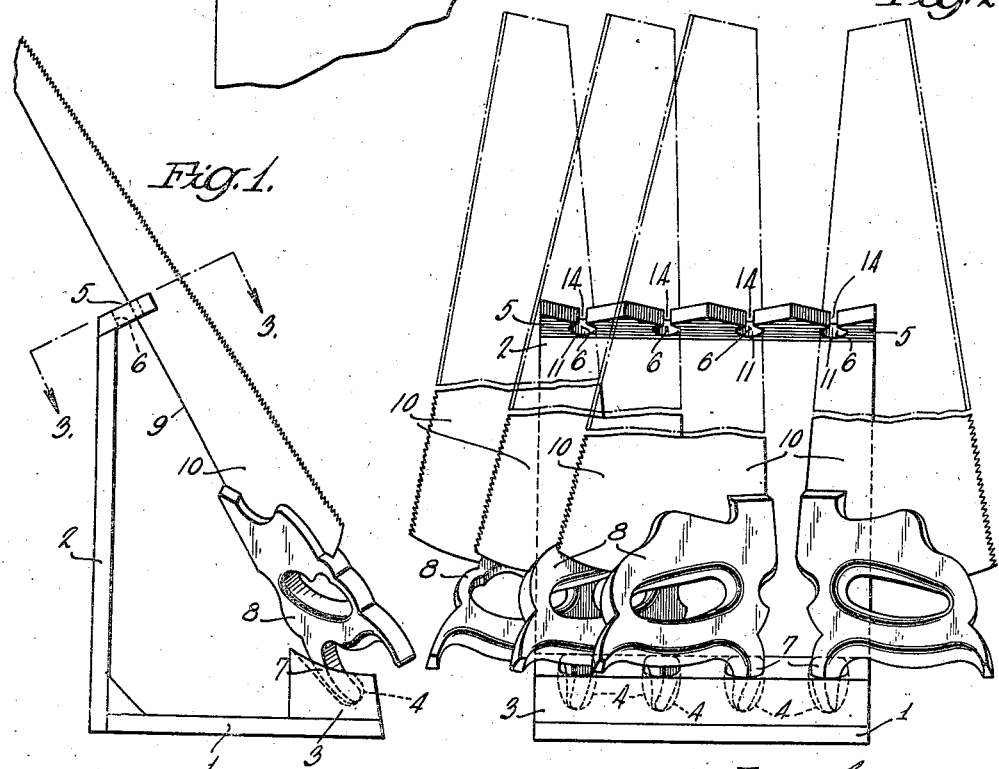
Inventor:-
James M. Owen
by his Attorneys
Howson & Howson Patented Jan. 19, 1943

2,308,533

UNITED STATES PATENT OFFICE 2,308,533

SAW RACK

James M. Owen, Seattle, Wash., assignor to Henry Disston & Sons, Incorporated, Tacony, Pa., a corporation of Pennsylvania Application November 9, 1939, Serial No. 303,661

6 Claims. (Cl. 211—13)

This invention relates to improvements in racks for saws.

A principal object of the invention is to provide a rack of simple structural form and efficient design which, by reason of certain inherent characteristics hereinafter set forth, shall be well adapted for display and sales purposes.

Another object of the invention is to provide a rack wherein a plurality of saws may be retained in compact arrangement and in a manner permitting thorough inspection or examination of each individual saw without the necessity for removing the saw from the rack.

Another object of the invention is to provide a rack of the character set forth above wherein the saws are supported individually in a manner permitting ready removal of the saw from the rack.

Still another object of the invention is to provide a rack wherein the saws are supported in a manner to permit manipulation of the saw while in the rack to positions exposing both faces of the saw, and wherein said manipulation may be effected readily by slight manual force applied to the handle only of the saw, thereby avoiding the necessity for fingering the blade.

A further object of the invention is to provide a rack of the character set forth in the preceding paragraph wherein the saws are supported in the rack in positions in which the handles are prominently presented for manipulation of the saws as described, or for removal of the saws from the rack, whereby tendency to handle the blades is avoided.

A still further object of the invention is to provide a rack wherein the saws are supported in overlapping arrangement such that the entire group of saws, or any selected contiguous number of said saws, may be turned between alternative positions exposing the opposite faces by manipulation of the handle of a single saw, as hereinafter more fully described.

The invention further resides in certain structural details and arrangements hereinafter described and illustrated in the attached drawing, in which:

Figure 1 is a side elevational view of a rack made in accordance with my invention;

Fig. 2 is a front elevational view of the rack, and

Fig. 3 is a section on the line 3—3, Fig. 1.

With reference to the drawing, the rack, which may be made of wood or any other suitable material, comprises a base 1 and a back 2 which extends upwardly from the rear of said base. At the forward end of the base is a longitudinal member 3 which contains a longitudinal series of sockets 4, and at the upper end of the back member 2 is a forwardly projecting strip 5 containing a corresponding series of recesses or sockets 6, the recesses 6 being in alignment with the sockets 4, as shown in Fig. 2, in vertical planes extending at right angles to the plane of the back 2. In mounting the saws in the rack, the back horn 7 of the handle 8 of each saw is inserted in one of the sockets 4, and the back edges 9 of the blades 10 are seated in the corresponding recesses 6, so that the saws rest in stable inclined position, as shown in Fig. 1, and are retained in this position by gravity. It will be noted that the strip 5 extends forwardly and upwardly from the back 2 in a plane which is substantially at right angles to the back edges 9 of the saw blades 10 when the latter are mounted, as described, in the rack.

The bottom or inner end 11 of each of the recesses 6 is rounded, as best shown in Fig. 3. This rounded inner portion terminates at each end in a flat stop surface, 12 and 13 respectively, these surfaces converging toward each other at an acute angle to a vertical plane at right angles to the back and intersecting the center of the recess. Between the proximate ends of the surfaces 12 a narrow slotted opening 14, see Fig. 2, affords access to the rounded inner portion of the recess. Extending forwardly at a reverse angle from the terminal end of each of the surfaces 12 is a flat surface, 15 and 16 respectively, the surface 15 extending in parallel relation to the surface 13, and the surface 16 having a corresponding parallel relationship with the surface 12. The plane of the surface 15 is offset transversely from the plane of the surface 13 to an extent equal approximately to the thickness of a saw blade, and a correspondingly offset relation exists between the planes of the surfaces 16 and 12. When, therefore, the rear edge portion of the saw blade lies flatly against either of the surfaces 12 or 13, the body of the blade will lie flatly against the surface 16 or 15, as the case may be, and as illustrated in Fig. 3. The surfaces 15 and 16 are relatively extended and form a stable abutment for the blade.

It is apparent that a saw mounted in the rack may occupy one of two stable positions. In one position, the blade will engage the surfaces 12 and 16, and in the other extreme position the blade will engage the surfaces 13 and 15. In these positions, respectively, the opposite faces of the saw are presented to the front of the rack. The saw may be shifted from one of these positions to the other by merely moving the forward horn of the handle to the right or left, as the case may be, the handle pivoting in the socket 4 and the back edge of the saw blade following the curved surface 11 of the inner end of the recess. In this movement, the blade pivots about an axis approximately parallel in proximity to the back edge of the saw. In this movement, also, by reason of the inclination of the saw, gravity tends to hold the back edge of the blade in the bottom of the recess 6, and the curved inner surface of the recess functions to guide the blade to one or other of the extreme positions, as shown in Fig. 3.

When the saws are assembled in the rack, they may all occupy a position such as shown at the left of Fig. 2. The terminal saw at the left of the rack will be supported in this extreme position by the interengagement of the blade with the surfaces 13 and 15. The other saws in the rack assuming a similar position will overlap each other as illustrated, and the handles 8 of the saws will either lie flatly against each other as illustrated or will be supported by the blades in contiguity with each other. It will be apparent that when so arranged, each individual saw starting from the right may be turned over to the opposite extreme position, and one of the saws is so illustrated. If on the other hand it is desired to turn the entire group of saws over to the opposite position, this may be accomplished rapidly and smoothly by merely turning over the saw at the extreme left. In this movement, the handle of each saw will act upon the saw adjoining at the right to reverse the position of that saw in the rack, so that the turning movement of all of the saws in the rack occurs simultaneously and by the mere manipulation of the one terminal saw.

It will be noted further that by reason of the inclined position of the saw in the rack, the handle of each saw is presented prominently in an advanced position, so that for manipulating the saws as described above, the tendency is to take hold of the handle thus presented. Each individual saw may be readily withdrawn from the rack by swinging it from one extreme position to a position wherein the blade occupies a vertical plane at right angles to the back 2 of the rack, after which the blade may be freed from the recess 6 and the horn 7 from the socket 4. In this retractive movement, also, the simplest mode of operation is by gripping the handle of the saw rather than the blade. This avoidance of any necessity for fingering the blade is of considerable practical importance in that it precludes tarnishing or deterioration of the metal due to moisture deposited on the blade from the hands.

Attention is directed, also, to the fact that the member 3 is somewhat higher at the rear than at the front so that the mouths of the sockets 4 lie in effect in a forwardly inclined surface. This arrangement makes the sockets clearly visible from the front of the rack even when the latter is mounted at a considerable height, and materially facilitates the reinsertion of the individual saws in the rack after withdrawal. The front face of the member 3 is well adapted to receive price labels or descriptive matter pertaining to the saws supported in the rack.

It will be apparent that the actual detailed form of the rack may vary considerably from that illustrated, and that the forms and arrangements of the saw sockets and recesses may also vary considerably without departure from the invention.

I claim:

1. A rack for hand saws, said rack comprising in combination a pivotal support for the handle of the saw, and a recessed seat for the back of the saw blade, said seat having at its outer end convergent flat surfaces terminating at their proximate ends in a slot, an enlarged concave inner end to which said slot gives access, the terminal ends of said concavity at opposite sides of said slot being formed as stops for the back edge of the blade, and each of said stops being in approximate alignment with the said outer flat surface at the opposite side of the slot, whereby when the rear edge of the blade is in engagement with either of said stops, the body of the blade may find support upon the companion surface.

2. A rack for hand saws, said rack comprising a socket for the saw handle, and a recess laterally spaced from said socket for reception of the blade, said socket and recess together forming a fixed rest in which the saw is supported in longitudinally stable position for pivotal movement about an axis longitudinally of the blade, said recess having a base for engagement with one longitudinal edge of the blade, and converging shoulders for engagement respectively with the opposite faces of the blade substantially on the line of said axis, said shoulders constituting stops limiting the extent of said pivotal movement.

3. In a rack for hand saws, laterally spaced parallel members, one of said members having a series of sockets and another of said members having a corresponding series of recesses, each socket and the corresponding recess being adapted respectively to receive the handle and the blade of a saw and forming jointly a fixed rest in which the saw is supported in longitudinally stable position for pivotal movement about an axis longitudinally of the blade, said recess having a base forming a bearing for one longitudinal edge of the blade, and converging shoulders for engagement respectively with the opposite faces of the blade substantially on the line of said axis, said shoulders constituting stops limiting the extent of said pivotal movement, and said sockets and recesses being closely set in the respective series so that in the extreme positions of the said pivotal movement a saw in one of said rests will overlap the saw in an adjoining rest.

4. A rack for hand saws, said rack comprising a rest for supporting the saw in longitudinally stable position for pivotal movement about an axis longitudinally of the blade, said rest comprising a socket for reception of the saw handle, a recess having a base forming a bearing for one longitudinal edge of the saw blade, and converging shoulders for engagement with the respective opposite faces of the blade substantially on the line of said axis, said shoulders constituting stops to limit the extent of said pivotal movement.

5. A rack for hand saws, said rack comprising a series of sockets each adapted to receive the projecting end of one of the horns of a saw handle, and a corresponding series of recesses arranged above and rearwardly of said sockets for reception of the blades of the respective saws, each said socket and the companion recess forming a rest in which the saw is supported for pivotal movement in the socket about an axis extending longitudinally of the blade, said recess having a base forming a bearing for one edge of the blade, and a pair of projecting shoulders for engagement respectively with the opposite faces of the blade substantially on the line of said axis, said shoulders constituting stops to limit the extent of the pivotal movement of the blade in the recess, the said sockets and also the recesses of the respective series being in close proximity so that in the extreme positions of said pivotal movement the handle of a saw supported in one of the sets of sockets and recesses will overlap the handle of a saw supported in an adjoining set.

6. A rack for hand saws, said rack comprising a socket for the saw handle, and a recess laterally spaced from said socket for reception of the blade, said socket and recess together forming a fixed rest in which the saw is supported in longitudinally stable position for pivotal movement about an axis longitudinally of the blade, said recess having a rounded base forming a bearing for one longitudinal edge of the blade, and shoulders for engagement respectively with the opposite faces of the blade substantially on the line of said axis, said shoulders being closely spaced so as to substantially confine the blade against lateral movement in the recess and forming stops to limit the extent of said pivotal movement.

JAMES M. OWEN.